United States Patent
Wu

(10) Patent No.: US 9,709,815 B2
(45) Date of Patent: Jul. 18, 2017

(54) 3D DISPLAY ASSEMBLY AND 3D DISPLAY APPARATUS WITH SPACING LAYER

(71) Applicant: BOE Technology Group Co., Ltd., Beijing (CN)

(72) Inventor: Yanbing Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 207 days.

(21) Appl. No.: 14/436,350

(22) PCT Filed: Aug. 28, 2014

(86) PCT No.: PCT/CN2014/085387
§ 371 (c)(1),
(2) Date: Apr. 16, 2015

(87) PCT Pub. No.: WO2015/131508
PCT Pub. Date: Sep. 11, 2015

(65) Prior Publication Data
US 2015/0346501 A1 Dec. 3, 2015

(30) Foreign Application Priority Data
Mar. 7, 2014 (CN) .......................... 2014 1 0084217

(51) Int. Cl.
*H04N 13/04* (2006.01)
*G02B 27/22* (2006.01)
(Continued)

(52) U.S. Cl.
CPC ......... *G02B 27/2214* (2013.01); *G02B 27/26* (2013.01); *G02F 1/1335* (2013.01);
(Continued)

(58) Field of Classification Search
CPC .. G02B 27/2228; G02B 27/2235; G02B 5/30; G02B 27/017; G02B 27/0172;
(Continued)

(56) References Cited

U.S. PATENT DOCUMENTS

2001/0022562 A1 9/2001 Ishikawa
2007/0019119 A1* 1/2007 Tanaka .................. G02F 1/1347
349/15
(Continued)

FOREIGN PATENT DOCUMENTS

CN 1748173 A 3/2006
CN 102269887 A 12/2011
(Continued)

OTHER PUBLICATIONS

Second Office Action, including Search Report, for Chinese Patent Application No. 201410084217.5, dated Jun. 2, 2016, 8 pages.
(Continued)

*Primary Examiner* — Scott J Sugarman
*Assistant Examiner* — Henry Duong
(74) *Attorney, Agent, or Firm* — Westman, Champlin & Koehler, P.A.

(57) ABSTRACT

The present disclosure provides a 3D display assembly and a 3D display apparatus including the 3D display assembly. The 3D display assembly comprises a display panel, a 3D device and a spacing layer between the display panel and the 3D device, the display panel, the 3D device and the spacing layer overlapping with each other, wherein a first protrusion which extends beyond edges of the display panel and the 3D device is formed on at least one side of the spacing layer other than its side facing towards the display panel and its side facing towards the 3D device. The protrusion is used to (Continued)

support the entire display assembly to avoid misalignment between the display panel and the 3D device due to undue weight of the spacing layer.

18 Claims, 2 Drawing Sheets

(51) Int. Cl.
  *G02B 27/26* (2006.01)
  *G02F 1/1333* (2006.01)
  *G02F 1/1335* (2006.01)
(52) U.S. Cl.
  CPC ....... *G02F 1/133308* (2013.01); *H04N 13/04* (2013.01); *G02F 2001/133322* (2013.01)
(58) Field of Classification Search
  CPC .... G02B 27/2214; G02B 27/26; H04N 13/04; G02F 1/133308; G02F 1/1335; G02F 2001/133322
  USPC .......................................................... 359/475
  See application file for complete search history.

(56) References Cited

U.S. PATENT DOCUMENTS

| | | | |
|---|---|---|---|
| 2011/0176073 A1 | 7/2011 | Chang et al. | |
| 2013/0076704 A1* | 3/2013 | Song | G02B 27/26 345/204 |
| 2014/0307197 A1* | 10/2014 | Moriwaki | G09F 9/30 349/58 |

FOREIGN PATENT DOCUMENTS

| | | |
|---|---|---|
| CN | 202306009 U | 7/2012 |
| CN | 103018946 A | 4/2013 |
| CN | 103885230 A | 6/2014 |

OTHER PUBLICATIONS

First Office Action, including Search Report, for Chinese Patent Application No. 201410084217.5, dated Dec. 24, 2015, 9 pages.
English translation of Box No. V of the Written Opinion for the International Searching Authority for International Patent Application No. PCT/CN2014/085387, 4 pages.
International Search Report and Written Opinion for PCT Application No. PCT/CN2014/085387, dated Dec. 17, 2014, 11 pages.

\* cited by examiner

3D DISPLAY ASSEMBLY AND 3D DISPLAY APPARATUS WITH SPACING LAYER

CROSS-REFERENCE TO RELATED APPLICATION

This application is a Section 371 National Stage application of International Application No. PCT/CN2014/085387, filed Aug. 28, 2014, which has not yet published, which claims priority to Chinese Patent Application No. 201410084217.5, filed Mar. 7, 2014, in Chinese, the contents of which are hereby incorporated by reference in their entirety.

BACKGROUND OF THE INVENTION

Field of the Invention

The present disclosure relates to the technical field of display, and more particularly, relates to a 3D display assembly and a 3D display apparatus.

Description of the Related Art

Naked eyes 3D technology is one of the current popular 3D display technologies. In the naked eyes 3D technology, a 3D device is provided in front of the conventional display panel (i.e., observation side) to achieve 3D display. The 3D device includes a parallax baffle, a liquid crystal lens or the like.

In order to achieve a suitable observation distance, in particular for large dimension products, a spacing layer with a certain thickness is adhered between the display panel and the 3D device by adhesives. The spacing layer may be made from transparent, flat material, for example glass. In particular, as illustrated in FIG. 1, the conventional 3D display assembly includes a display panel 110, a polarizer 120 (first polarizer), a polarization analyzer 130 (second polarizer), a first adhesive layer 140, a spacing layer 150, a second adhesive layer 160 and a 3D device 170. The spacing layer 150 is adhered by the first adhesive layer 140 to the polarization analyzer 130. The 3D device 170 is adhered by the second adhesive layer 160 to the spacing layer 150.

In FIG. 1, the display panel 110 has a relatively large dimension. It extends beyond the entire apparatus on two sides. After the 3D display assembly is placed behind a backlight assembly 180 (the backlight assembly is necessary for the liquid crystal display panel, the backlight assembly 180 functions to provide a backlight source and to support the liquid crystal display panel, the supporting bracket is necessary for an OLED display panel), the backlight assembly 180 supports an entire display assembly by an extension of the display panel 110 or by the 3D device. However, the heavy spacing layer 150 and 3D device are both adhered to the polarizer 130 of the display panel 110. As indicated by arrows in FIG. 1, due to relative large weight, the polarizer 130 and the respective layers on the observation side may be displaced such that the display panel and 3D device are misaligned with each other. In this way, the part indicated by a dot line block will be moved downwardly to degrade the display quality of the product.

SUMMARY OF THE INVENTION

An embodiment of the present invention provides a 3D display assembly and a 3D display apparatus, which may prevent misalignment of the display panel and the 3D device due to undue weight of the spacing layer.

According to an aspect of the present disclosure, it provides a 3D display assembly, comprising a display panel, a 3D device and a spacing layer between the display panel and the 3D device, wherein the display panel, the 3D device and the spacing layer overlap with each other, and a first protrusion which extends beyond edges of the display panel and the 3D device is formed on at least one side of the spacing layer other than its side facing towards the display panel and its side facing towards the 3D device.

In an embodiment, a distance by which the first protrusion extends beyond the edges of the display panel and the 3D device may be greater than a sum of cutting tolerance and alignment tolerance for the spacing layer.

In an embodiment, the 3D display assembly may further comprise:

a first polarizer and a second polarizer arranged on two opposite sides of the display panel respectively, wherein the second polarizer is located between the display panel and the spacing layer.

In an embodiment, the 3D display assembly may further comprise:

a first adhesive layer arranged between the second polarizer and the spacing layer and configured to adhere the spacing layer to the second polarizer; and a second adhesive layer arranged between the 3D device and the spacing layer and configured to adhere the 3D device to the spacing layer.

In an embodiment, the first protrusion may form a support portion supporting a weight of the 3D display assembly.

In an embodiment, a second protrusion which extends beyond edges of the display panel and the 3D device may be formed on the side of the spacing layer in opposite to its side on which the first protrusion is formed.

In an embodiment, a distance by which the second protrusion extends beyond the edges of the display panel and the 3D device may be greater than a sum of cutting tolerance and alignment tolerance for the spacing layer.

In an embodiment, a distance by which the second protrusion extends beyond the edges of the display panel and the 3D device may be equal to a distance by which the first protrusion extends beyond the edges of the display panel and the 3D device.

In an embodiment, the first protrusion and/or the second protrusion may form a support portion/support portions supporting a weight of the 3D display assembly.

According to another aspect of the present disclosure, it provides a 3D display apparatus comprising the 3D display assembly as described in any one of the above embodiments.

In an embodiment, the first protrusion may be formed on the side of the spacing layer facing towards the bottom of the 3D display apparatus.

In an embodiment, the first protrusion may be formed on a lateral side of the 3D display apparatus.

In an embodiment, the 3D display apparatus may further comprise a backlight assembly or a supporting bracket connected to the first protrusion to support the 3D display assembly.

According to another aspect, it provides a 3D display apparatus comprising:

the 3D display assembly as described in any one of the above embodiments including the first protrusion and the second protrusion; and a backlight assembly or a supporting bracket connected to the first protrusion and/or the second protrusion to support the 3D display assembly.

In the 3D display assembly and 3D display apparatus provided by the embodiment of the present invention, the protrusion which extends beyond edges of the display panel and the 3D device is formed on at least one side of the spacing layer between the display panel and the 3D device other than its side facing towards the display panel and its side facing towards the 3D device. The protrusion may be used as a member supporting the entire 3D display assembly and thereby, to avoid the misalignment of the display panel and the 3D device due to undue weight of the spacing layer.

DETAILED DESCRIPTION OF EMBODIMENTS OF THE INVENTION

Figure 1:
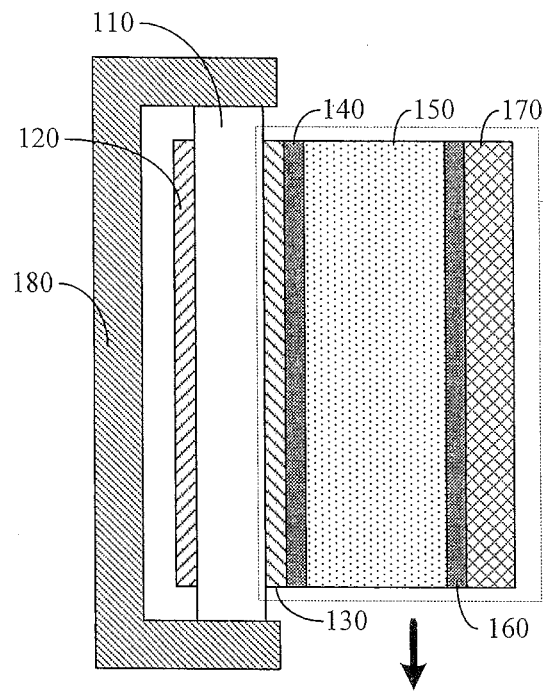
FIG. 1 is a schematic view showing a structure of a 3D display apparatus in the prior art.

Exemplary embodiments of the present disclosure will be described in details hereinafter with reference to the attached drawings. The following embodiments are only intended to illustrate the present invention, instead of limiting the scope of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In accordance with the generic concept of the present invention, it provides a 3D display assembly comprising a display panel, a 3D device and a spacing layer between the display panel and the 3D device, the display panel, the 3D device and the spacing layer overlapping with each other, wherein a first protrusion which extends beyond edges of the display panel and the 3D device is formed on at least one side of the spacing layer other than its side facing towards the display panel and its side facing towards the 3D device.

Figure 2A:
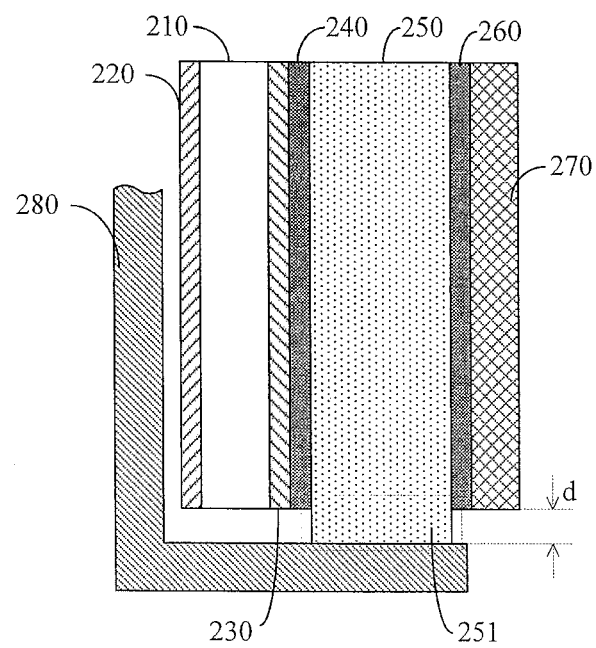
FIG. 2a is a schematic view (side view) showing a structure of a 3D display apparatus including a 3D display assembly in accordance with an embodiment of the present invention.

A 3D display assembly provided by an embodiment of the present invention includes: a display panel, a 3D device and a spacing layer between the display panel and the 3D device, the display panel, the 3D device and the spacing layer overlapping with each other. In particular, as illustrated in FIG. 2a, the 3D display assembly includes a display panel 210, a polarizer 220 (first polarizer), a polarization analyzer 230 (second polarizer), a first adhesive layer 240, a spacing layer 250, a second adhesive layer 260 and a 3D device 270. The spacing layer 250 may be adhered by a first adhesive layer 240 to the polarization analyzer 230 of the display panel 210. The 3D device 270 is adhered by a second adhesive layer 260 to the spacing layer 250. In order to prevent the display panel 210 or the 3D device 270 from being used as a support member and thus to avoid misalignment between the display panel and the 3D device caused by a too heavy spacing layer, in the embodiment, a first protrusion 251 (as indicated by dot line block in FIG. 2a) which extends beyond edges of the display panel 210 and the 3D device is formed on at least one side of the spacing layer 250 other than its side facing towards the display panel 210 and its side facing towards the 3D device 270. The spacing layer 250 may be made from relatively hard and non-deformable materials, for example, relatively thick glass. By means of supporting the entire 3D display assembly by the protrusion 251, the reliability may be improved to reduce the risk of displacement of the display panel 210 and the 3D device 270.

As an example, in order to ensure the bottom edge (top edge, leftmost edge or rightmost edge) of the entire 3D display assembly to be the bottom edge of the spacing layer 250, the distance d by which the first protrusion 251 extends beyond the edges of the display panel and the 3D device may be greater than the sum of the cutting tolerance and the alignment tolerance for the spacing layer 250.

Figure 2B:
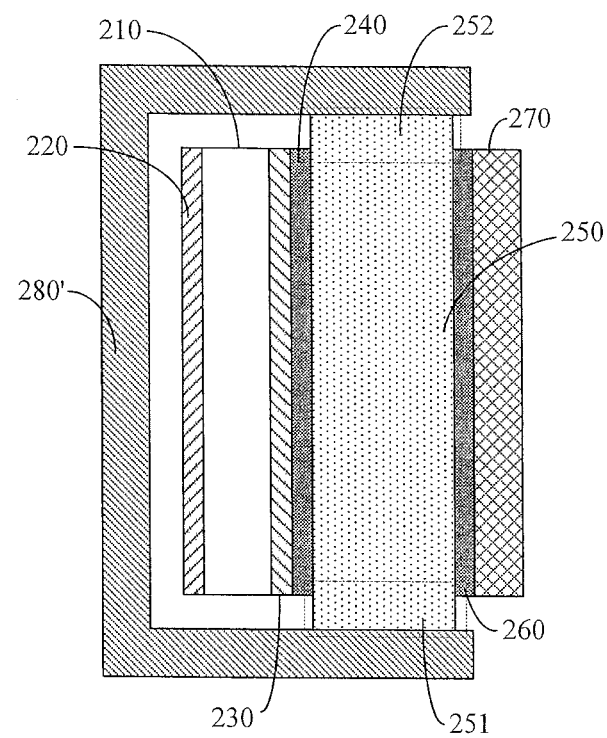
FIG. 2b is a schematic view (side view) showing another structure of a 3D display apparatus including a 3D display assembly in accordance with an embodiment of the present invention.

As an example, in order to support the entire 3D display assembly more stably, as illustrated in FIG. 2b, a second protrusion 252 which extends beyond edges of the display panel 210 and the 3D device 270 is formed on the side of the spacing layer 250 in opposite to its side on which the first protrusion 251 is formed, that is, on top of the 3D display assembly, the spacing layer 250 extends beyond the edges of the display panel 210 and the 3D device 270 to form the second protrusion 252. As an example, the distance by which the second protrusion 252 extends beyond the edges of the display panel 210 and the 3D device 270 is also greater than the sum of the cutting tolerance and the alignment tolerance for the spacing layer 250. Preferably, in convenience of production and cutting, the distance by which the second protrusion 252 extends beyond the edges of the display panel 210 and the 3D device 270 may be equal to the distance by which the first protrusion 251 extends beyond the edges of the display panel 210 and the 3D device 270. However, this case is not necessary. Alternatively, the distance by which the second protrusion 252 extends beyond the edges of the display panel 210 and the 3D device 270 may be greater or less than the distance by which the first protrusion 251 extends beyond the edges of the display panel 210 and the 3D device 270.

In the above example, the first protrusion 251 and/or the second protrusion 252 may form a support portion/support portions supporting a weight of the 3D display assembly.

An embodiment of the present invention also provides a 3D display apparatus including the 3D display assembly as described in any one of the above embodiments.

In the embodiment as illustrated in FIG. 2a, the spacing layer 250 is provided on the bottom side of the 3D display apparatus and extends beyond the edges of the display panel 210 and the 3D device 270, that is, the first protrusion 251 is formed on the side of the spacing layer facing towards the bottom of the 3D display apparatus, in other words, the first protrusion 251 is located on the bottom of the entire 3D display apparatus. However, alternatively, the first protrusion 251 may also be located on the top of the entire 3D display apparatus. As an example, the spacing layer 250 may also be provided on one of lateral sides of the 3D display apparatus and extend beyond the edges of the display panel 210 and the 3D device 270, that is, the first protrusion 251 is formed on one of lateral sides of the 3D display apparatus, in other words, the first protrusion 251 is located on the one of lateral sides of the entire 3D display apparatus.

Figure 3:
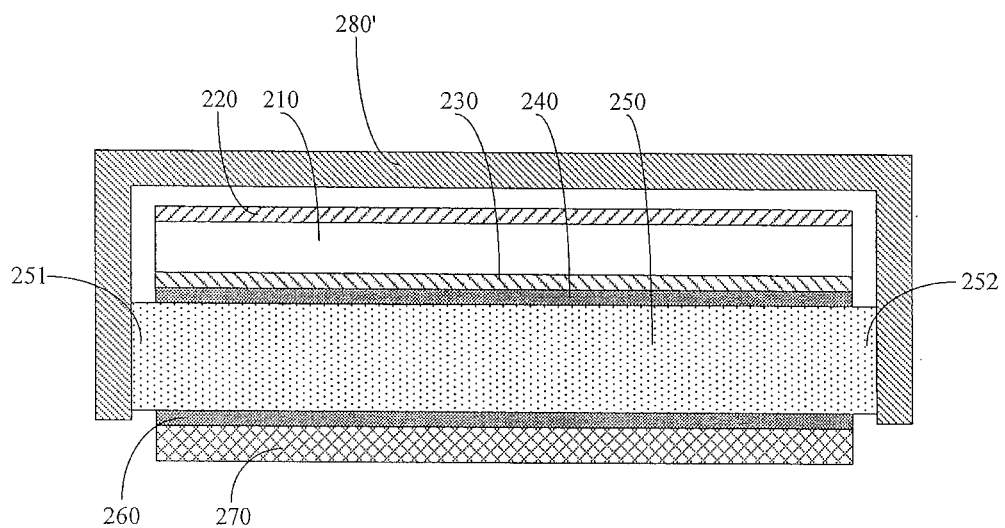
FIG. 3 is a schematic view (top view) showing a further structure of a 3D display apparatus including a 3D display assembly in accordance with an embodiment of the present invention.

In FIGS. 2a and 2b, the first protrusion 251 and the second protrusion 252 are provided on the bottom and the top of the 3D display apparatus respectively. Alternatively, as illustrated in FIG. 3, the first protrusion 251 and the second protrusion 252 may also be located on the lateral sides of the 3D display apparatus, for example, left and right sides. The first protrusion 251 and the second protrusion 252 located on the left and right sides respectively may support the entire 3D display apparatus. In this way, the display panel 210 or the 3D device 270 may be prevented from being used as the supporting member to avoid the misalignment between the display panel and the 3D device caused by undue weight of the spacing layer.

As an example, the 3D display apparatus, for example a 3D liquid crystal display apparatus, may further include a backlight assembly 280 connected with the first protrusion 251, in order to support the entire 3D display apparatus. The backlight assembly 280 may include a backlight source and a supporting bracket. For example, the supporting bracket may be connected to the first protrusion 251. As an example, the 3D display apparatus, for example a 3D OLED display apparatus, may include a supporting bracket connected to the first protrusion 251 without the backlight source.

Taking the 3D display assembly having the first protrusion 251 and the second protrusion 252 as one example, the backlight assembly 280' in the 3D display apparatus (for example 3D liquid crystal display apparatus) may be connected to the first protrusion 251 and/or the second protrusion 252 to support the 3D display apparatus. As an example, the 3D display apparatus (for example 3D OLED display apparatus) may also include the supporting bracket connected to the first protrusion and/or the second protrusion to support the 3D display apparatus.

The above embodiments are only used to explain the present disclosure, instead of limiting the present invention. It would be appreciated by those skilled in the relevant art that various changes or modifications may be made without departing from the spirit and scope of the present disclosure. Thus, all of equivalents also fall within the scope of the present invention. The scope of the present invention is defined in the appended claims.

What is claimed is:

1. A 3D display assembly, comprising a display panel, a 3D device and a spacing layer between the display panel and the 3D device,
wherein the display panel, the 3D device and the spacing layer overlap with each other, and a first protrusion which extends beyond edges of the display panel and the 3D device is formed on at least one side of the spacing layer other than its side facing towards the display panel and its side facing towards the 3D device, and wherein a distance by which the first protrusion extends beyond the edges of the display panel and the 3D device is greater than a sum of cutting tolerance and alignment tolerance for the spacing layer.

2. The 3D display assembly according to claim 1, further comprising:
a first polarizer and a second polarizer arranged on two opposite sides of the display panel respectively, wherein the second polarizer is located between the display panel and the spacing layer.

3. The 3D display assembly according to claim 2, further comprising:
a first adhesive layer arranged between the second polarizer and the spacing layer and configured to adhere the spacing layer to the second polarizer; and
a second adhesive layer arranged between the 3D device and the spacing layer and configured to adhere the 3D device to the spacing layer.

4. The 3D display assembly according to claim 3, wherein the first protrusion forms a support portion supporting a weight of the 3D display assembly.

5. The 3D display assembly according to claim 2, wherein the first protrusion forms a support portion supporting a weight of the 3D display assembly.

6. The 3D display assembly according to claim 1, wherein the first protrusion forms a support portion supporting a weight of the 3D display assembly.

7. The 3D display assembly according to claim 1, wherein the first protrusion forms a support portion supporting a weight of the 3D display assembly.

8. The 3D display assembly according to claim 1, wherein a second protrusion which extends beyond edges of the display panel and the 3D device is formed on the side of the spacing layer in opposite to its side on which the first protrusion is formed.

9. The 3D display assembly according to claim 8, wherein a distance by which the second protrusion extends beyond the edges of the display panel and the 3D device is greater than a sum of cutting tolerance and alignment tolerance for the spacing layer.

10. The 3D display assembly according to claim 8, wherein a distance by which the second protrusion extends beyond the edges of the display panel and the 3D device is equal to a distance by which the first protrusion extends beyond the edges of the display panel and the 3D device.

11. The 3D display assembly according to claim 8, wherein the first protrusion and/or the second protrusion forms/form a support portion/support portions supporting a weight of the 3D display assembly.

12. A 3D display apparatus, comprising a 3D display assembly, the 3D display assembly comprising a display panel, a 3D device and a spacing layer between the display panel and the 3D device, wherein the display panel, the 3D device and the spacing layer overlap with each other, and a first protrusion which extends beyond edges of the display panel and the 3D device is formed on at least one side of the spacing layer other than its side facing towards the display panel and its side facing towards the 3D device, and wherein a distance by which the first protrusion extends beyond the edges of the display panel and the 3D device is greater than a sum of cutting tolerance and alignment tolerance for the spacing layer.

13. The 3D display apparatus according to claim 12, further comprising:
a first polarizer and a second polarizer arranged on two opposite sides of the display panel respectively, wherein the second polarizer is located between the display panel and the spacing layer.

14. The 3D display apparatus according to claim 13, further comprising:
a first adhesive layer arranged between the second polarizer and the spacing layer and configured to adhere the spacing layer to the second polarizer; and
a second adhesive layer arranged between the 3D device and the spacing layer and configured to adhere the 3D device to the spacing layer.

15. The 3D display apparatus according to claim 12, wherein the first protrusion is formed on the side of the spacing layer facing towards the bottom of the 3D display apparatus.

16. The 3D display apparatus according to claim 12, wherein the first protrusion is formed on a lateral side of the 3D display apparatus.

17. The 3D display apparatus according to claim 12, further comprising a backlight assembly or a supporting bracket connected to the first protrusion to support the 3D display assembly.

18. A 3D display apparatus comprising:
- a 3D display assembly, the 3D display assembly comprising a display panel, a 3D device and a spacing layer between the display panel and the 3D device, wherein the display panel, the 3D device and the spacing layer overlap with each other, and a first protrusion which extends beyond edges of the display panel and the 3D device is formed on at least one side of the spacing layer other than its side facing towards the display panel and its side facing towards the 3D device, and a second protrusion which extends beyond edges of the display panel and the 3D device is formed on the side of the spacing layer in opposite to its side on which the first protrusion is formed; and
- a backlight assembly or a supporting bracket connected to the first protrusion and/or the second protrusion to support the 3D display assembly; and
- wherein a distance by which the first protrusion extends beyond the edges of the display panel and the 3D device is greater than a sum of cutting tolerance and alignment tolerance for the spacing layer.

* * * * *